(12) United States Patent
Krichtafovitch

(10) Patent No.: US 10,960,407 B2
(45) Date of Patent: Mar. 30, 2021

(54) COLLECTING ELECTRODE

(71) Applicant: Pacific Air Filtration Holdings, LLC, Boulder, CO (US)

(72) Inventor: Igor Krichtafovitch, Kiev (UA)

(73) Assignee: AGENTIS AIR LLC, Columbia, MD (US)

( * ) Notice: Subject to any disclaimer, the term of this patent is extended or adjusted under 35 U.S.C. 154(b) by 0 days.

(21) Appl. No.: 16/309,886

(22) PCT Filed: Jun. 13, 2017

(86) PCT No.: PCT/US2017/037319
§ 371 (c)(1),
(2) Date: Dec. 13, 2018

(87) PCT Pub. No.: WO2017/218584
PCT Pub. Date: Dec. 21, 2017

(65) Prior Publication Data
US 2019/0329269 A1 Oct. 31, 2019

Related U.S. Application Data

(63) Continuation-in-part of application No. 15/182,584, filed on Jun. 14, 2016, now abandoned.

(51) Int. Cl.
*B03C 3/47* (2006.01)
*B03C 3/60* (2006.01)
(Continued)

(52) U.S. Cl.
CPC .............. *B03C 3/47* (2013.01); *B01D 46/10* (2013.01); *B03C 3/60* (2013.01); *B03C 3/80* (2013.01); *B03C 2201/00* (2013.01)

(58) Field of Classification Search
CPC combination set(s) only.
See application file for complete search history.

(56) References Cited

U.S. PATENT DOCUMENTS

| 1,650,097 | A | 11/1927 | Schmidt |
| 1,931,436 | A | 10/1933 | Walther |

(Continued)

FOREIGN PATENT DOCUMENTS

| CN | 2319732 | 5/1999 |
| CN | 1926651 A | 3/2007 |

(Continued)

OTHER PUBLICATIONS

Wen, T., Wang, H., Krichtofovich, I., Mamishev, A., Novel Electrodes of an Electrostatic Precipitator for Air Filtration, submitted to Journal of Electronics Nov. 12, 2014, Seattle, Washington.

*Primary Examiner* — Christopher P Jones
*Assistant Examiner* — Sonji Turner
(74) *Attorney, Agent, or Firm* — Ungerman IP PLLC; Mark E. Ungerman

(57) ABSTRACT

A collecting electrode element for an electrostatic air cleaner with a reduced weight can be constructed with a lightweight conductive core sandwiched between particle collection layers which are supported and stabilized by a rigid frame. The conductive core may be conductive foil, conductive film, conductive ink, or conductive glue. The particle collecting layers may be flexible open-cell foam such as melamine which may be compressed between opposing frame elements. The frame may leave most and preferably at least 90% of the surface of the particle collecting layers exposed. The frame may have opposing frame elements secured to each other at a compressed area of the particle-collecting layers.

13 Claims, 2 Drawing Sheets

(51) Int. Cl.
*B03C 3/80* (2006.01)
*B01D 46/10* (2006.01)

(56) References Cited

U.S. PATENT DOCUMENTS

| | | | |
|---|---|---|---|
| 1,957,560 A | 5/1934 | Thompson | |
| 2,142,129 A | 1/1939 | Wilhelm et al. | |
| 2,271,597 A | 2/1942 | Lionel | |
| 2,526,402 A | 10/1950 | Palmer | |
| 2,771,963 A | 11/1956 | Warren | |
| 2,868,319 A * | 1/1959 | Rivers | B03C 3/60 96/67 |
| 2,997,130 A | 8/1961 | Nodolf | |
| 3,040,497 A | 6/1962 | Schwab | |
| 3,157,479 A | 11/1964 | Boles | |
| 3,258,900 A * | 7/1966 | Harms | F24F 13/28 55/485 |
| 3,452,225 A | 6/1969 | Gourdine | |
| 3,504,482 A | 4/1970 | Goettl | |
| 3,518,462 A | 6/1970 | Brown | |
| 3,710,588 A | 1/1973 | Martinez | |
| 3,751,715 A | 8/1973 | Edwards | |
| 3,763,633 A * | 10/1973 | Soltis | B03C 3/155 96/58 |
| 3,816,980 A | 6/1974 | Schwab | |
| 3,831,351 A | 8/1974 | Gibbs et al. | |
| 3,959,715 A | 5/1976 | Canning | |
| 3,960,505 A | 6/1976 | Marks | |
| 4,057,405 A | 11/1977 | Cheney et al. | |
| 4,077,785 A | 3/1978 | Hartshorn | |
| 4,098,591 A | 7/1978 | Diepenbroek et al. | |
| 4,124,359 A | 11/1978 | Geller | |
| 4,133,653 A * | 1/1979 | Soltis | B03C 3/40 96/58 |
| 4,160,202 A | 7/1979 | James et al. | |
| 4,166,729 A | 9/1979 | Thompson et al. | |
| 4,167,612 A * | 9/1979 | Tucker | C08G 18/6558 521/110 |
| 4,177,047 A | 12/1979 | Goland | |
| 4,178,156 A | 12/1979 | Tashiro et al. | |
| 4,231,766 A | 11/1980 | Spurgin | |
| 4,246,010 A | 1/1981 | Honacker | |
| 4,259,093 A | 3/1981 | Vlastos et al. | |
| 4,259,707 A | 3/1981 | Penney | |
| 4,264,343 A | 4/1981 | Natarajan et al. | |
| 4,290,003 A | 9/1981 | Lanese | |
| 4,390,830 A | 6/1983 | Laugesen | |
| 4,390,831 A | 6/1983 | Byrd et al. | |
| 4,433,281 A | 2/1984 | Herklotz et al. | |
| 4,486,704 A | 12/1984 | Gustafsson et al. | |
| 4,490,159 A | 12/1984 | Matts | |
| 4,516,991 A | 5/1985 | Kawashima | |
| 4,549,887 A * | 10/1985 | Joannou | B03C 3/14 55/493 |
| 4,604,112 A | 8/1986 | Ciliberti et al. | |
| 4,613,346 A | 9/1986 | Reyes et al. | |
| 4,643,745 A | 2/1987 | Sakakibara | |
| 4,673,416 A | 6/1987 | Sakakibara et al. | |
| 4,689,056 A | 8/1987 | Noguchi et al. | |
| 4,702,752 A * | 10/1987 | Yanagawa | B03C 3/155 55/529 |
| 4,719,535 A | 1/1988 | Zhenjun et al. | |
| 4,789,801 A | 12/1988 | Lee | |
| 4,886,526 A * | 12/1989 | Joannou | B03C 3/155 96/67 |
| 4,902,306 A * | 2/1990 | Burnett | B03C 3/155 55/486 |
| 4,904,283 A | 2/1990 | Hovis et al. | |
| 4,980,796 A | 12/1990 | Huggins | |
| 5,035,728 A | 7/1991 | Fang | |
| 5,055,118 A | 10/1991 | Nagoshi et al. | |
| 5,068,811 A | 11/1991 | Johnston et al. | |
| 5,108,470 A * | 4/1992 | Pick | B03C 3/155 96/58 |
| 5,123,524 A | 6/1992 | Lapeyre | |
| 5,232,478 A * | 8/1993 | Farris | B03C 3/155 55/356 |
| 5,251,171 A | 10/1993 | Yamauchi | |
| 5,254,155 A | 10/1993 | Mensi | |
| 5,330,559 A * | 7/1994 | Cheney | B03C 3/155 95/63 |
| 5,332,485 A | 7/1994 | Thompson | |
| 5,332,562 A | 7/1994 | Kersey et al. | |
| 5,336,299 A * | 8/1994 | Savell | B03C 3/30 55/487 |
| 5,395,430 A | 3/1995 | Lundgren et al. | |
| 5,466,279 A | 11/1995 | Hattori et al. | |
| 5,526,402 A | 6/1996 | Dent et al. | |
| 5,573,577 A * | 11/1996 | Joannou | B03C 3/155 96/66 |
| 5,628,818 A | 5/1997 | Smith et al. | |
| 5,679,121 A | 10/1997 | Kim | |
| 5,689,177 A | 11/1997 | Nielsen et al. | |
| 5,707,428 A | 1/1998 | Feldman et al. | |
| 5,807,425 A * | 9/1998 | Gibbs | B03C 3/155 96/66 |
| 5,827,407 A | 10/1998 | Wang et al. | |
| 5,846,302 A * | 12/1998 | Putro | B03C 3/155 96/66 |
| 5,914,454 A | 6/1999 | Imbaro et al. | |
| 5,922,111 A | 7/1999 | Omi et al. | |
| 5,993,521 A | 11/1999 | Loreth et al. | |
| 6,129,781 A | 10/2000 | Okamoto et al. | |
| 6,187,271 B1 | 2/2001 | Lee et al. | |
| 6,245,131 B1 | 6/2001 | Rippelmeyer et al. | |
| 6,251,171 B1 | 6/2001 | Marra et al. | |
| 6,504,308 B1 | 1/2003 | Krichtafovitch et al. | |
| 6,527,834 B1 | 3/2003 | Jörder et al. | |
| 6,635,106 B2 | 10/2003 | Katou et al. | |
| 6,656,248 B2 | 12/2003 | Ilmasti | |
| 6,660,061 B2 | 12/2003 | Josephson et al. | |
| 6,764,533 B2 * | 7/2004 | Lobiondo, Jr. | B03C 3/155 55/493 |
| 6,790,259 B2 | 9/2004 | Rittri et al. | |
| 6,805,732 B1 * | 10/2004 | Billiotte | A61L 9/22 264/129 |
| 6,831,271 B1 | 12/2004 | Guevremont et al. | |
| 6,888,314 B2 | 5/2005 | Krichtafovitch | |
| 6,937,455 B2 | 8/2005 | Krichtafovitch et al. | |
| 6,984,987 B2 | 1/2006 | Taylor et al. | |
| 7,008,469 B2 | 3/2006 | Vetter et al. | |
| 7,019,244 B2 | 3/2006 | Weaver et al. | |
| 7,048,780 B2 | 5/2006 | Kim et al. | |
| 7,112,238 B2 * | 9/2006 | Joannou | B03C 3/155 96/66 |
| 7,150,780 B2 | 12/2006 | Krichtafovitch et al. | |
| 7,163,572 B1 | 1/2007 | Liang et al. | |
| 7,182,805 B2 | 2/2007 | Reaves | |
| 7,258,729 B1 * | 8/2007 | Barsimanto | B03C 3/09 96/226 |
| 7,264,659 B1 | 9/2007 | Moshenrose | |
| 7,316,735 B2 | 1/2008 | Tomimatsu et al. | |
| 7,332,019 B2 | 2/2008 | Bias et al. | |
| 7,351,274 B2 | 4/2008 | Helt et al. | |
| 7,393,385 B1 | 7/2008 | Coffey et al. | |
| 7,431,755 B2 | 10/2008 | Kobayashi et al. | |
| 7,438,743 B2 | 10/2008 | Strauss | |
| 7,452,410 B2 | 11/2008 | Bergeron et al. | |
| 7,513,933 B2 | 4/2009 | Coppom et al. | |
| 7,531,027 B2 | 5/2009 | Tepper et al. | |
| 7,531,028 B2 | 5/2009 | Mello et al. | |
| 7,534,288 B2 | 5/2009 | Bromberg | |
| 7,553,353 B2 | 6/2009 | Lepage | |
| 7,569,100 B2 | 8/2009 | Tanaka et al. | |
| 7,582,144 B2 | 9/2009 | Krigmont | |
| 7,582,145 B2 | 9/2009 | Krigmont | |
| 7,594,958 B2 | 9/2009 | Krichtafovitch et al. | |
| 7,597,750 B1 | 10/2009 | Krigmont | |
| 7,608,135 B2 | 10/2009 | Mello et al. | |
| 7,652,431 B2 | 1/2010 | Krichtafovitch | |
| 7,686,869 B2 * | 3/2010 | Wiser | B01D 46/0032 96/66 |

(56) References Cited

U.S. PATENT DOCUMENTS

| | | | |
|---|---|---|---|
| 7,708,813 B2* | 5/2010 | Wiser | B03C 3/64 96/17 |
| 7,717,980 B2 | 5/2010 | Tepper et al. | |
| 7,736,418 B2 | 6/2010 | Graß | |
| 7,753,994 B2 | 7/2010 | Motegi et al. | |
| 7,758,675 B2 | 7/2010 | Naito et al. | |
| 7,780,761 B2 | 8/2010 | Gu et al. | |
| 7,815,719 B2 | 10/2010 | McKinney et al. | |
| 7,833,322 B2 | 11/2010 | Botvinnik et al. | |
| 7,857,884 B2 | 12/2010 | Bohlen | |
| 7,857,890 B2 | 12/2010 | Paterson et al. | |
| 7,896,957 B2 | 3/2011 | Zhao et al. | |
| 7,914,604 B2 | 3/2011 | Mello et al. | |
| 7,942,952 B2 | 5/2011 | Gale | |
| 7,998,255 B2 | 8/2011 | Blum | |
| 8,043,412 B2 | 10/2011 | Carlson | |
| 8,049,426 B2 | 11/2011 | Krichtafovitch et al. | |
| 8,092,768 B2 | 1/2012 | Miller et al. | |
| 8,211,208 B2 | 7/2012 | Chan et al. | |
| 8,241,396 B2 | 8/2012 | Ursem et al. | |
| 8,241,397 B2 | 8/2012 | Gu et al. | |
| 8,252,095 B2* | 8/2012 | Wiser | B03C 3/64 55/528 |
| 8,277,541 B2 | 10/2012 | Hunt et al. | |
| 8,278,797 B2 | 10/2012 | Sashida | |
| 8,349,052 B2 | 1/2013 | Noh et al. | |
| 8,357,233 B2 | 1/2013 | Chan | |
| 8,366,813 B2 | 2/2013 | Tokuda et al. | |
| 8,388,900 B2 | 3/2013 | Benedek et al. | |
| 8,404,020 B2 | 3/2013 | Farmer et al. | |
| 8,414,687 B2 | 4/2013 | Li | |
| 8,454,733 B2 | 6/2013 | Tanaka et al. | |
| 8,460,433 B2 | 6/2013 | Gefter et al. | |
| 8,492,733 B1 | 7/2013 | Klochkov et al. | |
| 8,506,674 B1 | 8/2013 | Brown-Fitzpatrick et al. | |
| 8,551,228 B2 | 10/2013 | Chan | |
| 8,574,345 B2 | 11/2013 | Ursem et al. | |
| 8,597,415 B2 | 12/2013 | Noh et al. | |
| 8,608,826 B2 | 12/2013 | Al-Hamouz | |
| 8,608,838 B2 | 12/2013 | Wong et al. | |
| 8,623,116 B2 | 1/2014 | Karlsson | |
| 8,624,476 B2 | 1/2014 | Sekoguchi | |
| 8,663,362 B2 | 3/2014 | Hagan | |
| 8,690,996 B2 | 4/2014 | Ji et al. | |
| 8,702,848 B2 | 4/2014 | Kulprathipanja et al. | |
| 8,721,775 B2* | 5/2014 | Chesebrough | B01D 39/14 55/486 |
| 8,736,043 B2 | 5/2014 | Konno et al. | |
| 8,741,018 B2 | 6/2014 | Belcher et al. | |
| 8,760,830 B2 | 6/2014 | Ikeda | |
| 8,795,601 B2* | 8/2014 | Wiser | B01D 39/14 55/486 |
| 8,845,782 B2 | 9/2014 | Metteer | |
| 8,873,215 B2 | 10/2014 | Waddell | |
| 8,889,079 B2 | 11/2014 | Zahedi | |
| 8,920,537 B2 | 12/2014 | Seike | |
| 8,999,040 B2 | 4/2015 | Johansson | |
| 9,028,588 B2 | 5/2015 | Hess | |
| 9,089,849 B2 | 7/2015 | Gu et al. | |
| 9,216,233 B2 | 12/2015 | Ota et al. | |
| 9,308,537 B2 | 4/2016 | Krichtafovitch | |
| 9,308,538 B2 | 4/2016 | Genereux et al. | |
| 9,327,293 B2 | 5/2016 | McKinney et al. | |
| 9,387,487 B2 | 7/2016 | McGrath | |
| 9,441,845 B2 | 9/2016 | Waddell | |
| 9,457,118 B2 | 10/2016 | Ota et al. | |
| 9,488,382 B2* | 11/2016 | Krichtafovitch | B03C 3/66 96/58 |
| 9,550,189 B2 | 1/2017 | Oertmann | |
| 9,630,186 B2 | 4/2017 | Back | |
| 9,797,864 B2 | 10/2017 | McKinney | |
| 9,827,573 B2* | 11/2017 | Afanasiev | B03C 3/66 96/58 |
| 9,943,796 B2* | 4/2018 | Ptak | B01D 46/10 |
| 10,168,059 B2* | 1/2019 | Yamaguchi | B03C 3/60 96/98 |
| 2002/0134932 A1 | 9/2002 | Guevremont et al. | |
| 2002/0152890 A1 | 10/2002 | Leiser | |
| 2002/0190658 A1 | 12/2002 | Lee | |
| 2003/0005824 A1 | 1/2003 | Katou et al. | |
| 2003/0131727 A1 | 7/2003 | Fissan et al. | |
| 2004/0023411 A1 | 2/2004 | Fenn | |
| 2004/0105802 A1 | 6/2004 | Duncan et al. | |
| 2004/0212329 A1 | 10/2004 | Krichtafovitch et al. | |
| 2005/0045036 A1* | 3/2005 | Vetter | B03C 3/45 96/66 |
| 2005/0045037 A1* | 3/2005 | Parisi | B03C 3/32 96/66 |
| 2006/0177356 A1 | 8/2006 | Miller | |
| 2006/0185511 A1 | 8/2006 | Tepper | |
| 2006/0278082 A1 | 12/2006 | Tomimatsu et al. | |
| 2006/0286017 A1 | 12/2006 | Hakka | |
| 2007/0028767 A1* | 2/2007 | Choi | B01D 29/016 95/59 |
| 2007/0148061 A1 | 6/2007 | Lau et al. | |
| 2007/0199450 A1* | 8/2007 | Wiser | B03C 3/64 96/69 |
| 2008/0030920 A1 | 2/2008 | Krichtafovitch et al. | |
| 2008/0092743 A1 | 4/2008 | Taylor et al. | |
| 2008/0121106 A1 | 5/2008 | Tepper et al. | |
| 2008/0170971 A1* | 7/2008 | Bergeron | B03C 3/155 422/171 |
| 2008/0282772 A1 | 11/2008 | Petinarides | |
| 2009/0114090 A1 | 5/2009 | Gu et al. | |
| 2009/0235817 A1 | 9/2009 | Gu et al. | |
| 2009/0235821 A1 | 9/2009 | Mochizuki et al. | |
| 2009/0320426 A1 | 12/2009 | Braunecker et al. | |
| 2010/0051709 A1 | 3/2010 | Krichtafovitch et al. | |
| 2010/0089240 A1 | 4/2010 | Krichtafovitch | |
| 2010/0095848 A1 | 4/2010 | Chang et al. | |
| 2010/0155025 A1 | 6/2010 | Jewell-Larsen et al. | |
| 2010/0229724 A1 | 9/2010 | Tokuda et al. | |
| 2010/0243885 A1 | 9/2010 | Tepper et al. | |
| 2011/0084611 A1 | 4/2011 | Schlitz et al. | |
| 2011/0286892 A1 | 11/2011 | Taylor et al. | |
| 2012/0073436 A1 | 3/2012 | Li | |
| 2013/0021715 A1 | 1/2013 | Jewell-Larsen et al. | |
| 2013/0047857 A1 | 2/2013 | Bohlen | |
| 2013/0047858 A1 | 2/2013 | Bohlen et al. | |
| 2013/0047859 A1 | 2/2013 | Bohlen | |
| 2013/0074690 A1 | 3/2013 | Tomimatsu et al. | |
| 2013/0183201 A1* | 7/2013 | Wiser | A61L 9/205 422/121 |
| 2013/0220128 A1 | 8/2013 | Gu et al. | |
| 2013/0276417 A1* | 10/2013 | Winters | B01D 39/14 55/486 |
| 2013/0284025 A1 | 10/2013 | Johansson et al. | |
| 2014/0150659 A1 | 6/2014 | McGrath | |
| 2014/0174294 A1 | 6/2014 | Krichtafovitch | |
| 2014/0345463 A1 | 11/2014 | Urata et al. | |
| 2014/0373717 A1 | 12/2014 | Wang | |
| 2015/0013541 A1 | 1/2015 | Vandenbelt et al. | |
| 2015/0059580 A1 | 3/2015 | Clement et al. | |
| 2015/0217018 A1* | 8/2015 | Sanchez Tavora | A61L 9/16 422/114 |
| 2015/0246595 A1 | 9/2015 | Forejt et al. | |
| 2015/0260147 A1 | 9/2015 | Schenk et al. | |
| 2015/0323217 A1* | 11/2015 | Krichtafovitch | B03C 3/45 95/74 |
| 2015/0337071 A1* | 11/2015 | Watanabe | B03C 3/45 96/66 |
| 2015/0343454 A1 | 12/2015 | Tyburk | |
| 2015/0353671 A1* | 12/2015 | Watanabe | B03C 3/45 96/66 |
| 2016/0013013 A1 | 1/2016 | Waddell | |
| 2016/0074876 A1* | 3/2016 | Afanasiev | B03C 3/60 96/98 |
| 2016/0074877 A1* | 3/2016 | Afanasiev | B03C 3/41 96/75 |
| 2016/0144379 A1* | 5/2016 | Wiser | B03C 3/66 96/58 |
| 2016/0184834 A1 | 6/2016 | Genereux et al. | |

(56) References Cited

U.S. PATENT DOCUMENTS

| | | | |
|---|---|---|---|
| 2016/0236205 A1 | 8/2016 | Seeley et al. | |
| 2017/0008008 A1 | 1/2017 | Umase | |
| 2017/0021363 A1 | 1/2017 | Krichtafovitch | |
| 2017/0072406 A1* | 3/2017 | Yamaguchi | ................ B03C 3/09 |
| 2017/0354977 A1 | 12/2017 | Krichtafovitch | |
| 2017/0354979 A1 | 12/2017 | Krichtafovitch | |
| 2017/0354980 A1* | 12/2017 | Krichtafovitch | .......... B03C 3/47 |
| 2017/0354981 A1 | 12/2017 | Krichtafovitch | |

FOREIGN PATENT DOCUMENTS

| | | | |
|---|---|---|---|
| CN | 201210251 | 3/2009 | |
| CN | 100552854 | 10/2009 | |
| CN | 101657247 B | 6/2013 | |
| CN | 103706479 A | 4/2014 | |
| CN | 105034756 A | 11/2015 | |
| CN | 205066003 U | 3/2016 | |
| DE | 4114935 A1 | 11/1991 | |
| EP | 0332624 B1 | 1/1992 | |
| EP | 2700452 A2 | 2/2014 | |
| GB | 1490315 A | 11/1977 | |
| JP | 53 98563 | * 8/1978 | ............. B01D 39/16 |
| JP | 59 19564 | * 2/1984 | ............. B03C 3/155 |
| WO | 2010025811 A1 | 3/2010 | |
| WO | 2012039826 A3 | 8/2012 | |
| WO | 2013173528 A1 | 11/2013 | |
| WO | 2015084112 A1 | 6/2015 | |

* cited by examiner

COLLECTING ELECTRODE

BACKGROUND OF THE INVENTION

1. Field of the Invention

The present invention relates to an electrode device such as an electrostatic air filter. More particularly, the present invention relates to a light weight collector electrode capable of collecting airborne particles, such as dust, before becoming saturated and in need of disposal or cleaning.

2. Description of the Related Technology

US Patent Publication No. 2015/0323217 entitled "Electronic Air Cleaners and Associated Methods" is expressly incorporated by reference herein and shows an electrostatic air cleaner with collecting electrodes that have an internal conductive portion sandwiched between collecting portions of open-cell, porous material. The prior art discloses that melamine foam may be used which is not flammable and has good porosity for collecting large amounts of dust. The prior art discloses that the internal conductive portion may be a metal plate, metal grid, a conductive film, or conductive ink. A drawback to the use of conductive film or ink is that it is not a rigid structure that will support otherwise flexible melamine foam. The prior art disclose that a rigid collecting material or a metal plate must have considerable thickness to be sufficient to keep all structures solid and rigid. Such structures may lead to heavy and expensive collecting electrodes. Typical electronic air cleaners contain a plurality of collecting electrodes.

In addition it is not practical and is wasteful to dispose of expensive metal plates.

It may be labor intensive and expensive to replace heavy collecting electrode assemblies due to inconvenient. Lightweight and inexpensive internal conductive parts like conductive film cannot support the collecting electrodes.

SUMMARY OF THE INVENTION

It is an object of the invention to provide lightweight, disposable, collecting electrode structures with sufficient rigidity to be used in electrostatic air cleaners.

A collecting electrode structure may include a rigid frame made of inexpensive plastic material. The rigid frame may be lightweight. The frame may include similar parts secured to two layers of porous, open-cell material with a conducting layer there between. This frame may define openings that expose most of the porous, open-cell material to the air. The exposed areas of the porous open-cell material may serve as the dust collection sites. The open-cell material may be a flexible structure which may be squeezed between two complementary frame parts under sufficient force. The frames may firmly hold the porous open-cell flexible material. The total thickness of the collecting electrode structure at the frame may advantageously be the same as the thickness of two layers of the porous open-cell material with a conducting layer there between.

According to an advantageous feature, a lightweight frame made of inexpensive plastic material may be used. The frame may have two similar parts between which the porous, open-cell material may be secured. The frame may define openings to expose most of the porous, open-cell material to the air for dust collection. Due to the open-cell flexible structure, the porous material may be squeezed between the two frame parts and be firmly kept by them. The electrode's total thickness is defined by the total thickness of the two frame parts together with any compressed open cell material and conductive layer, preferably will be the same as the collection portion thickness, i.e., two uncompressed layers of open-cell material with a conductive layer therebetween.

A collecting electrode element may have a first particle collecting layer having a porous external surface, a conductive layer adjacent to said first particle collecting layer on a side of said first particle collecting layer opposite of said porous external surface, a second particle collecting layer having a first side adjacent to a side of said conductive layer opposite said first particle collecting layer and having a porous external surface on a side of said second particle collecting layer opposite and said conductive layer, and a rigid frame supporting said particle collecting layers.

The rigid frame may have a first frame element on the side of the first particle collecting layer having a porous external surface and a second frame element.

The frame elements may be configured to define open areas exposing most of the sides of the first and second particle collecting layers having porous external surfaces. The open areas may expose at least 90% of the sides of said particle collecting layers having the porous external surfaces, i.e., a portion of the first particle collecting layer and a corresponding portion of the second particle collecting layer. The thickness of the frame elements and corresponding compressed particle collection layers may be equivalent to the thickness of uncompressed first particle collecting layer plus the thickness of compressed second particle collecting layer. The conductive layer may be a conductive film, a conductive foil, conductive ink, or conductive glue.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Figure 1:
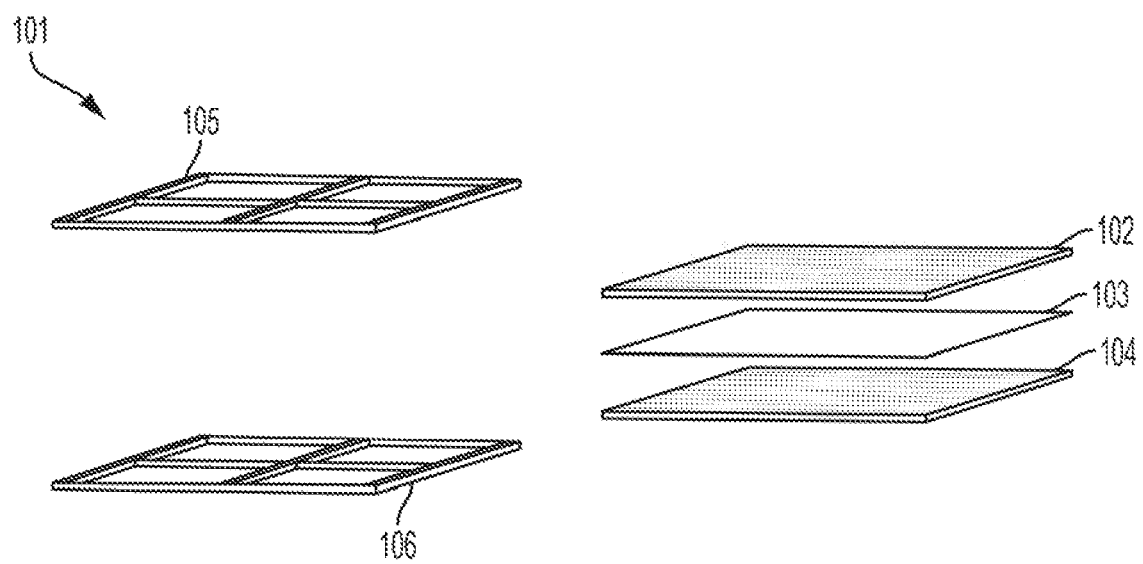
FIG. 1 shows an exploded view of a dust-collecting electrode.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

An electrostatic device may operate as an electrostatic air cleaner as a standalone device, integrated into an HVAC system or otherwise deployed. For example, according to one configuration an electrostatic air cleaner may be provided with a face size of 2'×2'. Such an air cleaner may have approximately 20 collecting electrode elements. Each collecting electrode element may be dimensioned to span the face of the cleaner (corresponding to 24") and a depth of 4" to 8". By way of example a set of 20 collecting electrode elements which are 24"×8" and made of steel sheets may weigh 40 pounds or more.

The weight of the collecting electrodes may be reduced substantially by reducing the weight of the inner conductive layer.

FIG. 1 shows an exploded view of components of a collecting electrode element 101 with reduced weight. The collecting electrode element 101 may include plastic frame elements 105 and 106, collection layers 102 and 104, and an internal conductive portion 103.

Advantageously the plastic frame elements 105 and 106 are sufficiently rigid to support and stabilize the collection layers 102 and 104 made of flexible material like an open cell foam. The frame elements 105 and 106 may have large openings ensuring that most of the external surface of the collecting layers 102, 104 are exposed for dust collection function. The internal conductive layer 103 may be made of an inexpensive, lightweight conductive material like conductive film, conductive glue, or conductive ink. The latter may be simply sprayed or applied to a surface of the outer collecting layer(s) 102 and/or 104.

Figure 2:
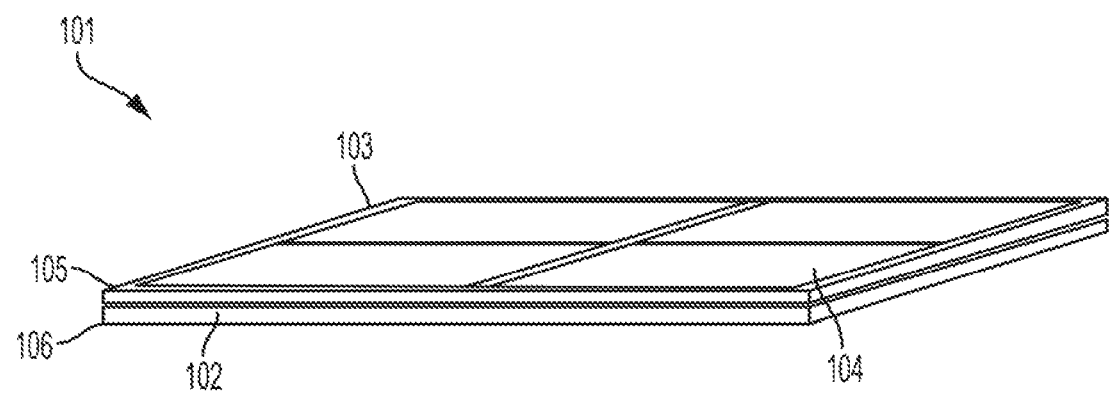
FIG. 2 schematically illustrates an assembled dust-collecting electrode.

FIG. 2 shows a schematic of a collecting electrode 101 as assembled. Two plastic frames 105 and 106 may be attached to each other. The outer collection layers 102 and 104 may be squeezed between the frames 105 and 106. Collection layers 102 and 104 and conducting layer 103 are sandwiched together by the frame elements 105, 106.

The collection layers 102 and 104 may be flexible sheets made of porous open-cell foam, such as melamine each with a thickness of about 4 mm. When compressed the thickness of the collections layers may be reduced dramatically for example to 1 mm each. When the collection layers 102, 104 are compressed between the plastic frame elements 105, 106, the width of the assembly may be only slightly larger than the width of the two plastic frame elements 105, 106.

The collecting electrode assembly may have the same thickness as two uncompressed layers of open-cell 4 mm thick foam together (i.e., 8 mm).

The plastic frame elements 105, 106 may have a width of about 6 mm in order to create a rather strong structure. By way of example the collecting electrode element has the same overall dimensions as in the example above (i.e., 20 collector elements, 8" by 24"), the weight of all 20 collecting electrode elements totaling about 1.25 lbs.

Taking into account that plastic is substantially cheaper than metal, one can appreciate the total weight and cost savings that the present invention may offer.

At the same time, about 90% of the collection surface area of the porous dust-collecting portion is exposed for dust collection.

It should be taken into account that the collecting electrodes are exposed to substantial air velocity. Front or tail surfaces perpendicular to the general direction of air flow present resistance to air flow and induce turbulence. The collection layers 102 and 104 generally aligned with the direction of air flow and the front portion of the rigid frame faces the general direction of air flow. It is possible to reduce the resistance and induced turbulence by providing the collecting electrode assemblies with more aerodynamic front and tail portions. According to an embodiment, the front portion may be rounded. According to an embodiment, the tail portion may be tapered. The collecting electrode elements may have a rigid frame with an aerodynamical shape.

The techniques, processes and apparatus described may be utilized to control operation of any device and conserve use of resources based on conditions detected or applicable to the device.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of a dust collecting electrode have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A collecting electrode element comprising:
a first particle collecting layer having a porous external surface wherein said first particle collecting layer is a first exposed outer layer of said collecting electrode element;
a conductive layer adjacent to said first particle collecting layer on a side of said first particle collecting layer opposite of said porous external surface;
a second particle collecting layer having a first side adjacent to a side of said conductive layer opposite said first particle collecting layer and having a porous external surface on a side of said second particle collecting layer opposite of said conductive layer wherein said second particle collecting layer is a second exposed outer layer of said collecting electrode element; and
a rigid frame supporting said particle collecting layers, wherein said rigid frame comprises at least a first frame element on the side of the first particle collecting layer having said porous external surface and a second frame element matching said first frame element and located on the side of the second particle collecting layer having said porous external surface;
wherein said first frame element is secured to said second frame element;
wherein said frame elements are configured to define open areas exposing at least 90% of said porous external surface of said first particle collecting layer and exposing at least 90% of said porous external surface of said second particle collecting layer;
wherein a portion of said first particle collecting layer and a portion of said second particle collecting layer corresponding to a location of said frame elements are compressed; and
wherein a thickness of said frame elements and corresponding compressed particle collection layers is equivalent to a thickness of uncompressed first particle collecting layer plus a thickness of uncompressed second particle collecting layer.

2. The collecting electrode element according to claim 1 wherein said conductive layer comprises a conductive film.

3. The collecting electrode element according to claim 1 wherein said conductive layer comprises a conductive foil.

4. The collecting electrode element according to claim 1 wherein said conductive layer comprises conductive ink.

5. The collecting electrode element according to claim 1 wherein said conductive layer comprises a conductive glue.

6. The collecting electrode element according to claim 1 wherein said rigid frame has an aerodynamical shape.

7. A collecting electrode element comprising:
a first particle collecting layer having a porous external surface which is a first exposed outer surface of said collecting electrode element;
a conductive layer adjacent to said first particle collecting layer on a side of said first particle collecting layer opposite of said porous external surface;
a second particle collecting layer having a first side adjacent to a side of said conductive layer opposite said first particle collecting layer and having a porous external surface which is a second exposed external surface of said collecting electrode element on a side of said second particle collecting layer opposite of said conductive layer, wherein said first particle collecting layer and said second particle collecting layer are open cell foam layers; and
a rigid frame supporting said particle collecting layers;
wherein a portion of said first particle collecting layer and a portion of said second particle collecting layer are compressed by said rigid frame and said first particle collecting layer and said second particle collecting layer are aligned with the general direction of air flow and said rigid frame has a front portion facing said general direction of air flow.

8. The collecting electrode element according to claim 7 wherein said conductive layer comprises a conductive film.

9. The collecting electrode element according to claim 7 wherein said conductive layer comprises a conductive foil.

10. The collecting electrode element according to claim 7 wherein said conductive layer comprises conductive ink.

11. The collecting electrode element according to claim 7 wherein said conductive layer comprises a conductive glue.

12. The collecting electrode element according to claim 7 wherein said rigid frame has an aerodynamical shape.

13. The collecting electrode element according to claim 7 wherein said conductive layer is continuous and sized to have a length and width to approximate a length and width of said first particle collecting layer.

* * * * *